(12) United States Patent
Vance et al.

(10) Patent No.: US 9,422,975 B2
(45) Date of Patent: Aug. 23, 2016

(54) SYSTEM AND METHOD FOR LUBRICATING PLAIN BEARINGS

(71) Applicant: Universal City Studios LLC, Orlando, FL (US)

(72) Inventors: Eric A. Vance, Ocoee, FL (US); Michael Roy Kiddoo, Orlando, FL (US)

(73) Assignee: Universal City Studios LLC, Orlando, FL (US)

(*) Notice: Subject to any disclaimer, the term of this patent is extended or adjusted under 35 U.S.C. 154(b) by 150 days.

(21) Appl. No.: 14/203,337

(22) Filed: Mar. 10, 2014

(65) Prior Publication Data

US 2015/0252844 A1    Sep. 10, 2015

(51) Int. Cl.
| | |
|---|---|
| *F16C 1/00* | (2006.01) |
| *F16C 17/18* | (2006.01) |
| *F16C 17/24* | (2006.01) |
| *F16C 41/00* | (2006.01) |
| *F16C 19/52* | (2006.01) |
| *F16C 17/02* | (2006.01) |
| *F16C 23/04* | (2006.01) |

(52) U.S. Cl.
CPC .............. *F16C 17/18* (2013.01); *F16C 17/24* (2013.01); *F16C 19/52* (2013.01); *F16C 41/001* (2013.01); *F16C 17/02* (2013.01); *F16C 23/045* (2013.01)

(58) Field of Classification Search
CPC .......... F16C 17/00; F16C 17/02; F16C 17/18; F16C 19/06; F16C 33/10; F16C 17/102; F16C 17/1025; F16C 17/103; F16C 17/106; F16C 17/1065; F16C 17/6603; F16C 17/6607; F16C 17/6637; F16C 17/664; F16C 23/043; F16C 25/04; F16C 41/001; F16C 2300/28

USPC ................................................... 384/322, 490
See application file for complete search history.

(56) References Cited

U.S. PATENT DOCUMENTS

| | | | |
|---|---|---|---|
| 1,899,691 A | 12/1930 | Jablow et al. | |
| 2,647,807 A | 6/1951 | Brunstrum | |
| 3,006,447 A | 10/1961 | Irwin | |
| 2015/0233419 A1* | 8/2015 | Hachtmann | ........... F16C 23/043 384/206 |

FOREIGN PATENT DOCUMENTS

| | | |
|---|---|---|
| FR | 27314802 | 9/1996 |
| JP | 08-219148 | 8/1996 |

OTHER PUBLICATIONS

PCT/US2015/017794; International Search Report and the Written Opinion, mailed Jun. 12, 2015, 13 pages.

* cited by examiner

*Primary Examiner* — James Pilkington
(74) *Attorney, Agent, or Firm* — Fletcher Yoder, P C

(57) ABSTRACT

A system includes a plain bearing assembly configured to enable rotation of a shaft about a bearing system axis of the shaft. The plain bearing assembly includes the shaft, a cylindrical intermediate bearing disposed about the shaft, and an external bearing disposed about the intermediate bearing. The plain bearing assembly is configured to facilitate oscillatory motion of the shaft relative to the external bearing such that, when the shaft rotates in a first direction about the bearing system axis, the intermediate bearing rotates about the bearing system axis in the first direction, and when the shaft rotates in a second direction opposite the first direction about the bearing system axis, rotation of the intermediate bearing about the bearing system axis is resisted or prevented.

19 Claims, 9 Drawing Sheets

SYSTEM AND METHOD FOR LUBRICATING PLAIN BEARINGS

BACKGROUND

The present disclosure relates generally to rotary components and, more particularly, to a system and method for lubricating plain bearings in oscillatory motion.

Mechanical bearings are used to support rotating equipment across a wide variety of industries, including amusement parks, manufacturing, automotive, computer hardware, industrial automation, and so forth. Bearing systems typically employ one or more rotating components that are lubricated to minimize friction between a rotating component (e.g., shaft) and a stationary component (a component that is generally stationary relative to the rotating component). For example, roller bearing assemblies often include multiple roller bearings seated between rotating and stationary components. Traditionally, plain bearing systems often use a single lubricated cylindrical bearing disposed between the rotating component and an external stationary component.

Bearing systems operate more efficiently when they are adequately lubricated. Oil or grease is applied to the bearings to help prevent dents or other deformations from forming on the bearings, stationary components, and rotating components. Such deformations can lead to inefficient operation of the bearing systems and the larger mechanical systems that they support. Once lubricant is applied to the bearing system, the bearings within the system mechanically apply and distribute the lubricant throughout the system. However, in bearing systems where the rotating components undergo oscillatory and/or very small rotations, it is now recognized that the bearings might not be able to adequately distribute the lubricant. Thus, it is now recognized that there exists a need for improved methods for lubricating bearing systems that facilitate oscillatory motion.

BRIEF DESCRIPTION

In accordance with one aspect of the present disclosure, a system includes a plain bearing assembly configured to enable rotation of a shaft about a bearing system axis of the shaft. The plain bearing assembly includes the shaft, a cylindrical intermediate bearing disposed about the shaft, and an external bearing disposed about the intermediate bearing. The plain bearing assembly is configured to facilitate oscillatory motion of the shaft relative to the external bearing such that, when the shaft rotates in a first direction about the bearing system axis, the intermediate bearing rotates about the bearing system axis in the first direction, and when the shaft rotates in a second direction opposite the first direction about the bearing system axis, rotation of the intermediate bearing about the bearing system axis is resisted or prevented.

In accordance with another aspect of the present disclosure, a bearing system includes a shaft axially aligned with a bearing system axis, a first collar disposed about and coupled to the shaft, a cylindrical intermediate bearing disposed about the shaft, a first friction or interlocking sprag including a first end rotatably coupled to the first collar and a second end in contact with a contact surface of the intermediate bearing, and a stationary external bearing disposed about the intermediate bearing. The first sprag is configured to engage the contact surface of the intermediate bearing in a manner that encourages rotation of the intermediate bearing in a first direction about the bearing system axis when the shaft is rotating in the first direction. The first sprag is configured to slide relative to the contact surface of the intermediate bearing to prevent or resist rotation of the intermediate bearing in a second direction about the bearing system axis when the shaft is rotating in the second direction opposite the first direction.

Present embodiments also provide a method for lubricating a plain bearing assembly. The method includes facilitating oscillatory rotation of a shaft about a bearing system axis of the shaft. The shaft is configured to rotate relative to a stationary element via a plain bearing assembly. The plain bearing assembly includes a collar disposed on the shaft, a cylindrical intermediate bearing disposed about the shaft, and an external bearing disposed about the intermediate bearing. The method also includes allowing the intermediate bearing to rotate about the bearing system axis in a first direction when the shaft rotates in the first direction about the bearing system axis. In addition, the method includes resisting rotation of the intermediate bearing about the bearing system axis in a second direction opposite the first direction when the shaft rotates in the second direction about the bearing system axis.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Presently disclosed embodiments are directed to systems and methods for lubricating bearings within a plain bearing assembly configured to support a rotary element (e.g., shaft) in oscillatory motion. The plain bearing assembly includes a shaft configured to rotate, an external bearing configured to remain stationary, and a cylindrical intermediate bearing disposed therebetween. The shaft, the intermediate bearing, and the external bearing may all be aligned with each other along a bearing system axis. The plain bearing assembly is generally configured such that, when the shaft is rotated in a first direction about the bearing system axis, the intermediate bearing also rotates around the bearing system axis in the first direction. However, when the shaft is rotated in a second direction opposite the first direction, the plain bearing assembly prevents the intermediate bearing from rotating about the bearing system axis in the second direction. That way, when the shaft oscillates, the intermediate bearing disposed between the shaft and the external bearing only moves about the bearing system axis in a single direction.

The presently disclosed embodiments may provide relatively increased distribution and reapplication of lubricant (e.g., oil, grease, etc.) between the shaft, the intermediate bearing, and the external bearing, as compared to systems that allow the intermediate bearing to oscillate about the bearing system axis with the shaft. Current plain bearing systems that allow the intermediate bearing to oscillate back and forth with the shaft may encounter certain difficulties leading to inefficient bearing operation. For example, if the angular rotation of the shaft about the bearing system axis is small, the intermediate bearing may not move far enough to pick up and redistribute lubricant located between the bearings. This could lead to inadequate lubrication of the bearings and inefficient operation of the plain bearing assembly. Presently disclosed embodiments include entirely mechanical components that facilitate motion of the intermediate bearing in just a single direction rotating about the bearing system axis, instead of the oscillatory motion described above, thereby increasing the mechanical application of lubricant throughout the bearing system.

Figure 1:
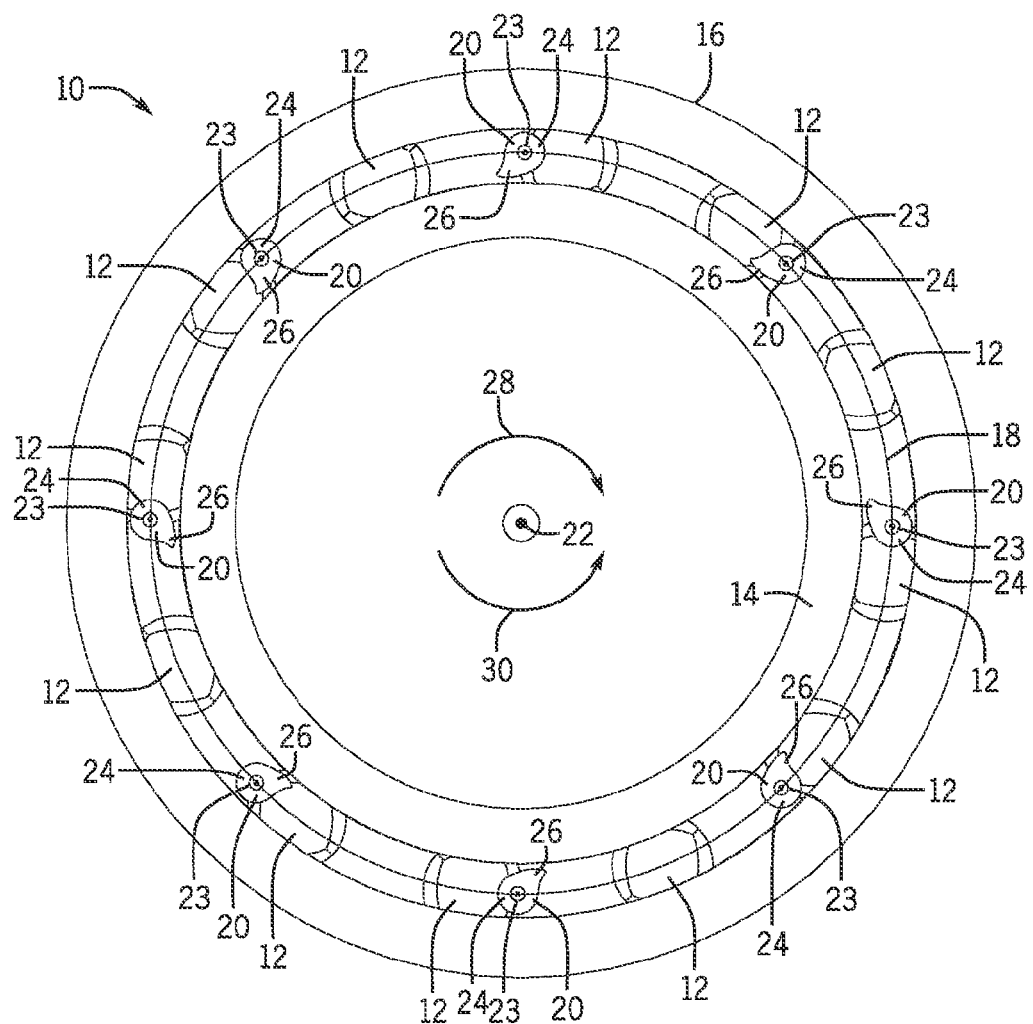
FIG. 1 is a front view of a rolling bearing element assembly configured to provide lubrication during oscillatory motion, in accordance with an embodiment of the present techniques.

FIG. 1 is a schematic illustration of one such bearing assembly 10 that transfers oscillatory motion of attached rotary equipment into one directional motion of rolling bearing elements 12 disposed therein. The illustrated bearing assembly 10 includes an inner race 14, an outer race 16, the plurality of rolling bearing elements 12 disposed between the inner and outer races 14 and 16, a bearing cage 18, and a plurality of indexing elements (e.g., sprags 20). The entire bearing assembly 10 is arranged concentrically about a bearing system axis 22.

In some embodiments, the inner race 14 is coupled to rotary equipment, such as a rotating shaft, during operation of the rolling bearing element assembly 10, and the outer race 16 is coupled to stationary equipment used to support the rotary equipment. Although the following discussion generally focuses on the bearing assembly 10 being driven by rotary equipment coupled to the inner race 14, it should be noted that, in other embodiments, the rolling bearing element assembly 10 may be driven by rotary equipment coupled to the outer race 16.

The rolling bearing elements 12 disposed between the races 14 and 16 may include ball bearings (arranged in a single row or double rows), cylindrical bearings (e.g., pins), tapered roller bearings, needle roller bearings, spherical roller bearings, and any other type of rolling bearing element 12 configured to be disposed between inner and outer races of a rolling bearing element assembly 10. The type of rolling bearing elements 12 used may be decided based on the expected loads on the rolling bearing element assembly 10. There may be any desirable number of rolling bearing elements 12 positioned in the rolling bearing element assembly 10.

Different configurations of the rolling bearing element assembly 10 may be used in different embodiments as well. For example, the disclosed rolling bearing element assembly 10 may be used in a radial loading configuration (e.g., supporting a rotating axle) or in a thrust loading configuration (e.g., vertically aligned rotary equipment). The rolling bearing element assembly 10 may promote one directional revolution of the rolling bearing elements 12 between the races 14 and 16 during oscillatory motion as well as during pre-loading of the rolling bearing element assembly 10.

The bearing cage 18, illustrated as a line in FIG. 1, may include any desired structure that extends between the rolling bearing elements 12 and is coupled to all the rolling bearing elements 12. The bearing cage 18 may allow rotation of the rolling bearing elements 12 relative to the bearing cage 18 while keeping the rolling bearing elements 12 positioned circumferentially about the bearing system axis 22. This may promote balanced distribution of forces within the bearing assembly 10 as it is driven by rotary equipment. In the illustrated embodiment, multiple sprags 20 are coupled to the bearing cage 18. It should be noted that any desired number of sprags 20 may be positioned circumferentially about the bearing assembly 10. Each sprag 20 may be rotatably coupled to the bearing cage 18 (e.g., via pins 23) at a first end 24 and be configured to engage the driven race (e.g., inner race) at a second end 26 opposite the first end 24. The sprags 20 may be spring-loaded to rotate in a particular direction about this rotational coupling. In the illustrated embodiment, for example, the sprags 20 may be spring-loaded to rotate counterclockwise about the rotational coupling (e.g., pin 23), in order to maintain the second end 26 in engagement with the inner race 14. In some embodiments, the sprags 20 may each include an integral spring mechanism for spring-loading the sprag about the rotational coupling. In other embodiments, each of the sprags 20 may be spring-loaded via a separate spring coupled to the sprag 20.

The term "sprag" may refer to an asymmetrically shaped indexing element that is spring-loaded and shaped to contact at least one contact surface of another component of the bearing assembly 10. The illustrated embodiment includes several asymmetric (e.g., teardrop) shaped sprags 20, each with a rounded leading edge at the first end 24 and a tapered trailing edge at the second end 26. The trailing edge may be specifically shaped to interlock with teeth or to increase a frictional force between the sprag 20 and the sprag contact surface. Although illustrated as using one or more sprags 20 to index components of the rolling bearing element assembly 10, it should be noted that any other desirable spring-loaded indexing element may be used in other embodiments.

The illustrated bearing assembly 10 may enable the rolling bearing elements 12 to revolve about the bearing system axis 22 in one direction, regardless of the direction of rotation of the driven inner race 14. Specifically, when the inner race 14 rotates in a first direction indicated by arrow 28 (e.g., clockwise), the sprags 20 engage with a contact surface of the inner race 14. In presently disclosed embodiments, the sprag 20 may be spring-loaded. More specifically, a spring or other biasing feature biases each sprag 20 against the contact surface, and a frictional force locks the sprags 20, the attached bearing cage 18, and the rolling bearing elements 12 into rotation in the first direction 28 as well. When the inner race 14 rotates in a second direction 30 (e.g., counterclockwise) opposite the first direction 28 about the bearing system axis 22, the inner race 14 slides past the sprags 20. The sprags 20 may be specifically shaped to minimize friction between the sprag 20 and the inner race 14, thereby enabling this sliding motion between the inner race 14 and the sprag 20, in one direction and to increase friction between the sprag 20 and the inner race 14 in the opposite direction. In some embodiments, as described below, the sprag 20 and the contact surface engaged by the sprag 20 may include a positive interlock (e.g., ratcheting) mechanism to provide this one directional engagement.

Figure 2:
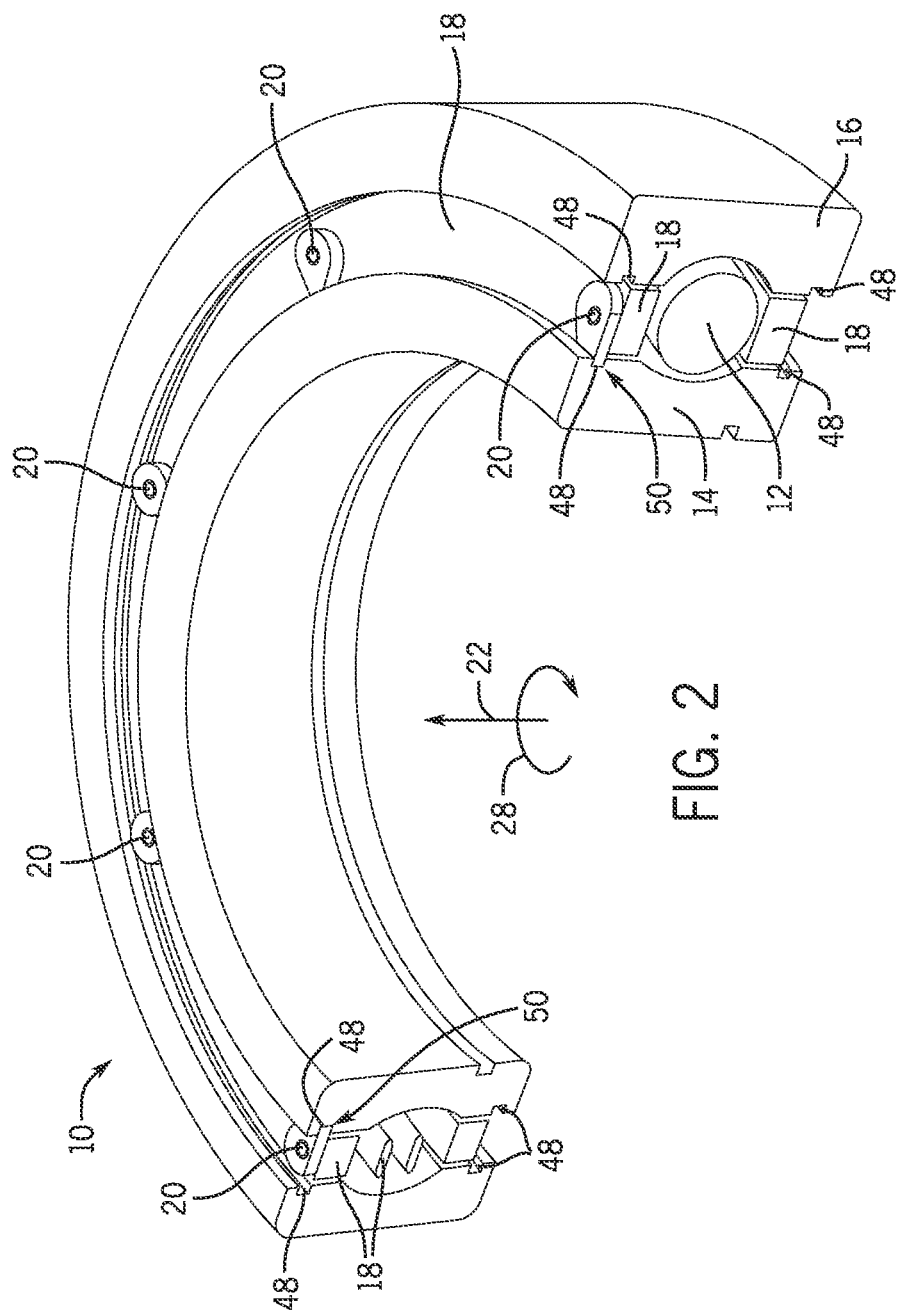
FIG. 2 is a perspective cutaway view of the rolling bearing element assembly of FIG. 1, in accordance with an embodiment of the present techniques.

FIG. 2 is a perspective cutaway view of an embodiment of the rolling bearing element assembly 10 of FIG. 1. The illustrated embodiment shows an arrangement of the sprags 20 rotatably coupled to the bearing cage 18 via pins 23. The bearing cage 18 may extend along the entire circumference of the annular region between the inner race 14 and the outer race 16. In the illustrated embodiment, the bearing cage 18 is configured to surround the rolling bearing elements 12 and to fill a space between each adjacent pair of rolling bearing elements 12, in order to keep the rolling bearing elements 12 circumferentially spaced about the bearing system axis 22.

In the illustrated embodiment, a groove 48 formed in the inner race 14 provides a contact surface 50 for the sprags 20. In some embodiments, the groove 48 is not included and the contact surface 50 is flush with an outer boundary of the inner race 14 (or the outer race 16 in other embodiments). The sprags 20 may be biased toward the contact surface 50 so that a frictional force between the sprags 20 and the contact surface 50 maintains the two components in engagement with one another as the inner race 14 rotates in the first direction 28. In some embodiments, the contact surface 50 may be textured to increase the frictional force between the contact surface 50 and the sprags 20. As discussed above, the sprags 20 are shaped to allow the inner race 14 to slip past the sprags 20 as the inner race 14 rotates in the opposite direction.

It should be noted that both the inner race 14 and the outer race 16 are collared in the illustrated embodiment. That is, each of the inner race 14 and the outer race 16 include collars that define grooves 48 on both sides of the rolling bearing elements 12. This may enable relatively flexible designs of the sprag 20/contact surface 50 interface to accommodate different configurations of the rolling bearing element assembly 10. For instance, in embodiments where the outer race 16 is driven instead of the inner race 14, the sprags 20 may be rotatably coupled to the bearing cage 18 in an opposite direction such that they extend into the groove 48 of the outer race 16 to engage a contact surface of the outer race 16. In either configuration (inner race 14 driven or outer race 16 driven), the sprags 20 may be disposed on both sides of the bearing cage 18 between the inner and outer races 14 and 16. This may provide redundancy and a balance of internal forces within the rolling bearing element assembly 10.

Figure 3:
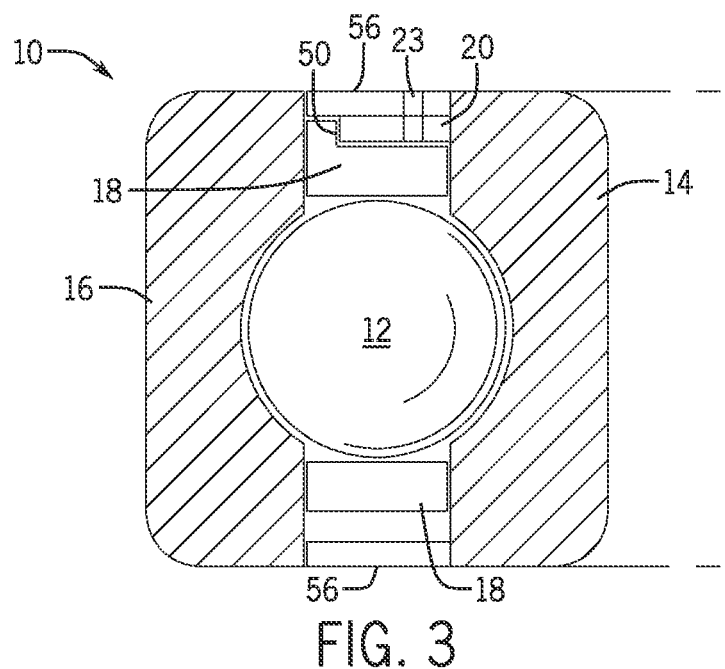
FIG. 3 is radial cross sectional view of the rolling bearing element assembly of FIG. 1, in accordance with an embodiment of the present techniques.

Other variations of the sprag 20 and contact surface 50 may be used in other embodiments. For example, FIG. 3 illustrates a radial cross sectional view of an embodiment of the rolling bearing element assembly 10 featuring sprags 20 rotatably coupled to the inner race 14 and the contact surface 50 disposed on the bearing cage 18. More specifically, the rolling bearing element assembly 10 may include an extended portion 56 coupled to the inner race 14 and extending toward the outer race 16. The sprag 20 is coupled to the extended portion 56 via a pin 23, or some other rotatable connection. In addition, it should be noted that the sprag 20 may be attached to the outer race 16 in embodiments where the outer race 16 is the drive portion of the rolling bearing element assembly 10.

Figure 4:
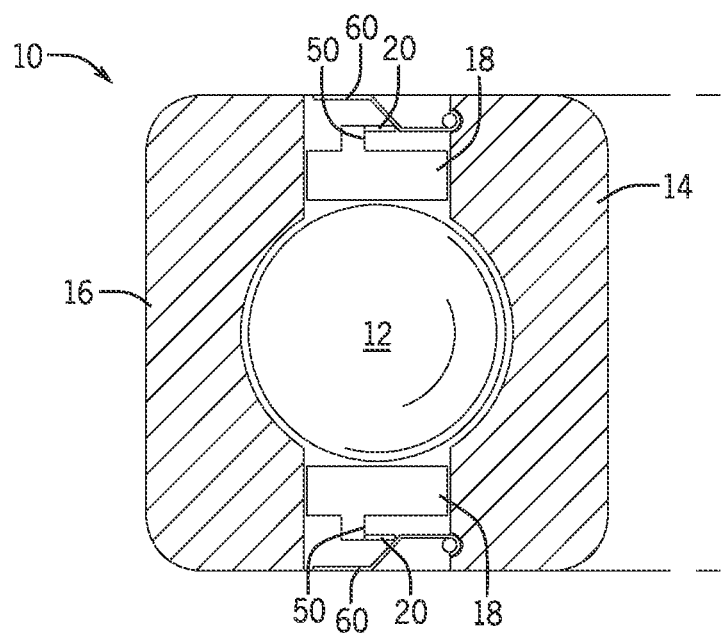
FIG. 4 is a radial cross sectional view of a sealed rolling bearing element assembly, in accordance with an embodiment of the present techniques.

In still other embodiments, the rolling bearing element assembly 10 may be sealed, as illustrated in FIG. 4, via a seal 60 configured to rotate with the inner race 14 (or outer race 16, depending on which one is driven), and the sprags 20 may be mounted to an inside surface of the seal 60 and configured to engage a contact surface 50 of the bearing cage 18. In the illustrated embodiment, two seals 60 are included, one on each side of the rolling bearing element assembly 10. However, in other embodiments, the seal 60 may be located just on one side of the rolling bearing element assembly 10. In the illustrated embodiment, the seals 60 are coupled to the inner race 14 and extend toward the outer race 16. However, this may be reversed in other embodiments. In some embodiments, the seal 60 of the rolling bearing element assembly 10 may be made from steel, wire, rubber, or some combination thereof. In addition, some embodiments may include one or more seals 60 that extend from one race (e.g., inner race 14 or outer race 16) into contact with the opposite race (e.g., outer race 16 or inner race 14).

Figure 5:
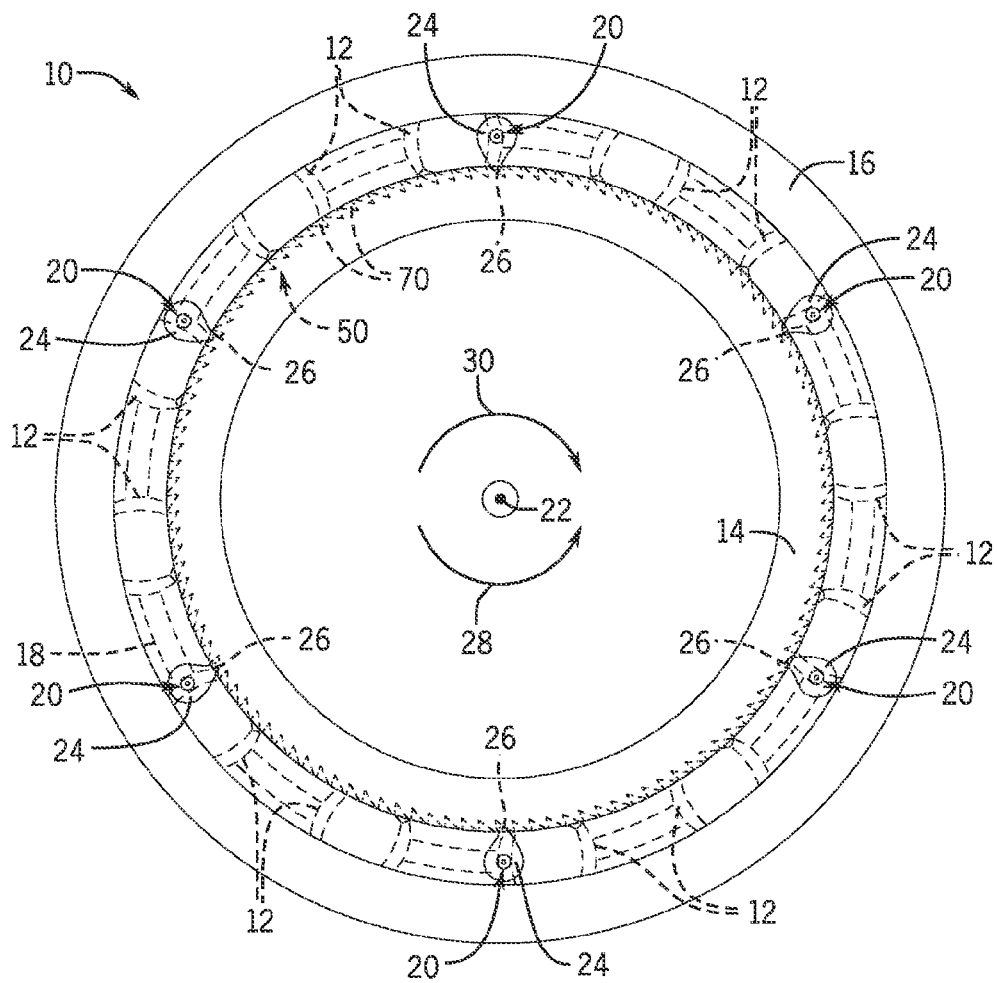
FIG. 5 is a front schematic view of the rolling bearing element assembly of FIG. 1, in accordance with an embodiment of the present techniques.

As noted above, some embodiments of the rolling bearing element assembly 10 may utilize a positive interlock mechanism to revolve the rolling bearing elements 12 about the bearing system axis 22 in a single direction. FIG. 5 illustrates one such embodiment of the rolling bearing element assembly 10. In this embodiment, the positive interlock mechanism is a ratcheting assembly including the sprags 20 and a contact surface 50 equipped with ratcheting teeth 70. Each sprag 20 may be spring-loaded to keep the second end 26 of the sprag 20 biased toward the teeth 70, such that the sprag 20 interlocks with the teeth 70 when the inner race 14 rotates in the first direction 28, while allowing the teeth 70 to slip past the sprag 20 when the inner race 14 rotates in the second direction 30.

As discussed above, other arrangements of the rolling bearing element assembly 10 may be used in other embodiments. For example, in embodiments where the outer race 16 is driven by the rotary component, the teeth 70 may be disposed on a surface of the outer race 16 and the sprags 20 may be reversed so that the second end 26 of the sprags 20 interlock with the teeth 70. Still further, in other embodiments, the teeth 70 may be disposed on a surface of the bearing cage 18, while the sprags 20 may be coupled to the inner race 14, the outer race 16, or the seal 60 configured to rotate with the driven race.

The teeth 70 may be sized and spaced around the contact surface 50 of the inner race 14 appropriately for the desired rotary application. That is, the teeth 70 may be arranged about the inner race 14 at a certain number of degrees about the bearing system axis 22 relative to each other. The number of degrees may be scalable and related to the relative size of components in the rolling bearing element system 10, such as a radius of the inner race 14, a radius of the outer race 16, a radius of the rolling bearing element 12, and a shape of the sprag 20.

Figure 6:
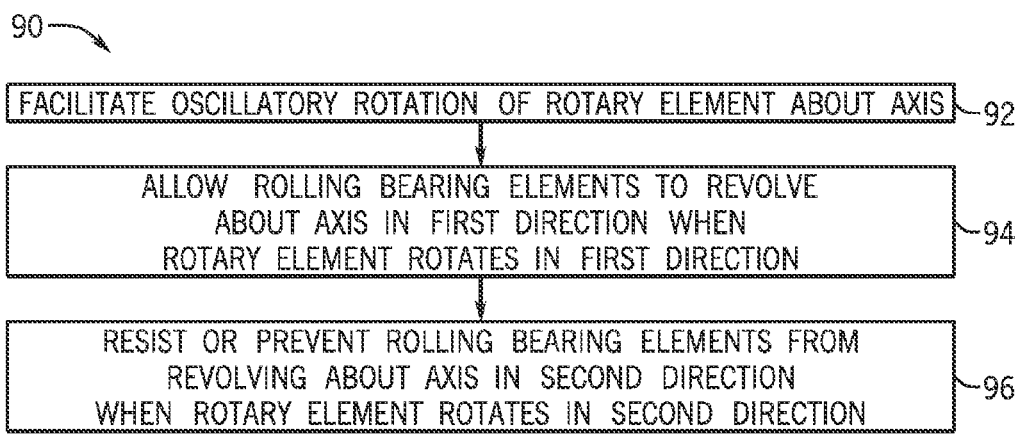
FIG. 6 is a process flow diagram of a method for lubricating a rolling bearing element assembly during oscillatory motion, in accordance with an embodiment of the present techniques.

FIG. 6 illustrates a method 90 for lubricating the rolling bearing element assembly 10 used in oscillating rotary applications. The method 90 includes facilitating (block 92) oscillatory rotation of a rotary element (e.g., shaft coupled to the inner race 14) about the bearing system axis 22. The method 90 also includes allowing (block 94) the rolling bearing elements 12 to revolve (via rotation relative to the stationary race) about the bearing system axis 22 in the first direction 28 when the rotary element rotates in the first direction 28. As discussed above, this may involve engaging the spring-loaded sprag 20 coupled to the bearing cage 18 (and the rolling bearing elements 12) with the contact surface 50 of the inner race 14 when the rotary element rotates in the first direction 28. In addition, the method 90 includes providing resistance to or preventing (block 96) the rolling bearing elements 12 from revolving about the bearing system axis 22 in the second direction 30 when the rotary element rotates in the second direction 30. This may involve sliding the contact surface 50 of the inner race 14 relative to the sprags 20 when the rotary element rotates in the second direction 30.

It should be noted that in the embodiments disclosed above, the rolling bearing elements 12 may revolve slightly in the second direction 30 in response to the rotary element rotating in the second direction 30. However, the distance of this revolution may be negligible in comparison with the revolution of the rolling bearing elements 12 in the first direction 28, as permitted by the sprags 20 and the contact surface 50. In addition, the rolling bearing elements 12 themselves are permitted to rotate about their own axes, regardless of whether or in what direction the bearing cage 18 and the rolling bearing elements 12 are revolving about the bearing system axis 22.

Figure 7:
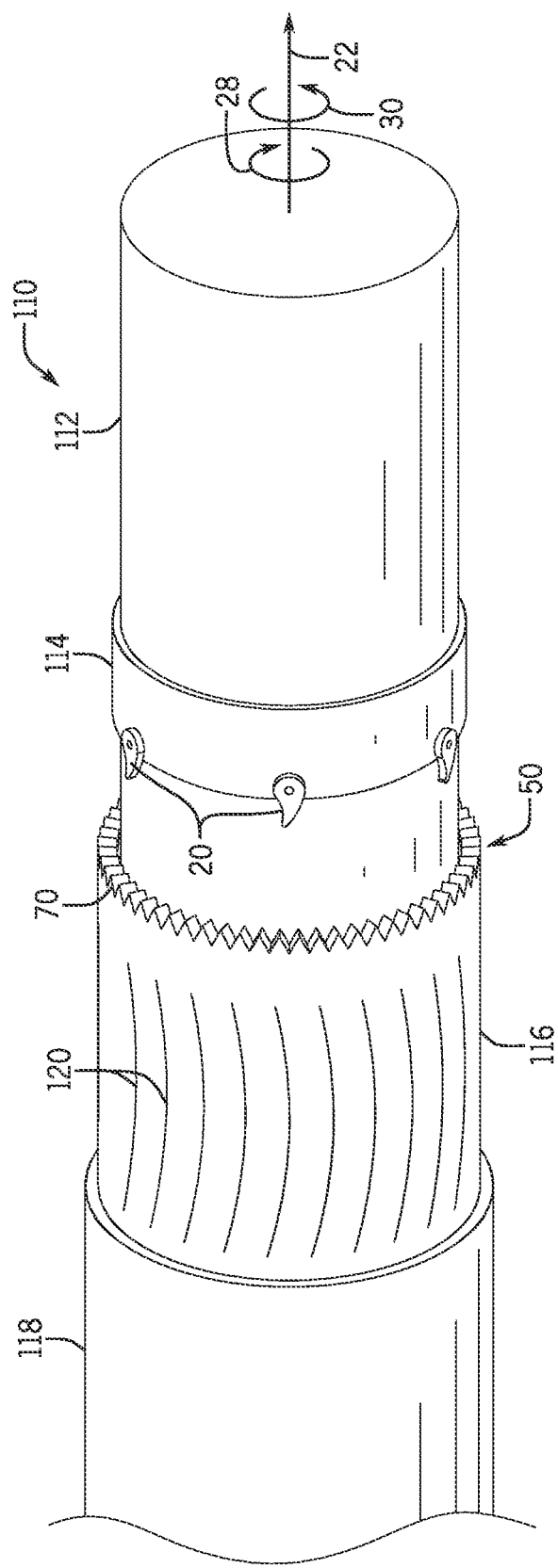
FIG. 7 is an exploded perspective view of a cylindrical plain bearing assembly configured to provide lubrication during oscillatory motion, in accordance with an embodiment of the present techniques.

Similar techniques may be applied to bearing systems that include cylindrical plain bearings disposed directly over the shaft or other rotary element. As an example, FIG. 7 is an exploded perspective view of a plain bearing assembly 110 that uses an arrangement of cylindrical plain bearings elements to allow a shaft 112 to rotate relative to a stationary component supporting the shaft 112. The plain bearing assembly 110 may be used for radial loading, thrust loading, or any other desired bearing configuration. The illustrated plain bearing assembly 110 may include, among other things, the shaft 112, a collar 114 attached to the shaft 112, an intermediate cylindrical bearing 116, and an external cylindrical bearing 118.

The collar 114 is disposed about and coupled to the shaft 112, and the collar 114 is configured to be disposed adjacent the intermediate bearing 116 disposed about the shaft 112. The intermediate bearing 116 is configured to freely rotate between the rotating shaft 112 and the external cylindrical bearing 118, which may be stationary, in order to reduce the friction between the rotating shaft 112 and stationary equipment. Grease, or some other lubricant, may be pumped into a space between the intermediate bearing 116 and the external cylindrical bearing 118, between the intermediate bearing 116 and the shaft 112, or both. As the shaft 112 rotates in an oscillating motion, the plain bearing assembly 110 encourages one directional rotation of the intermediate bearing 116 about the bearing system axis 22, in order to keep the lubricant evenly distributed between the bearing elements.

As discussed above with reference to the rolling bearing element assembly embodiments, a combination of the sprag 20 and the appropriate contact surface 50 may enable transfer of oscillatory rotation of a rotary component (e.g., shaft 112) to one-directional rotation of a bearing component (e.g., rolling bearing elements 12 or intermediate bearing 116). In the illustrated embodiment, the sprags 20 are disposed on and rotatably coupled to the collar 114 of the shaft 112. The sprags 20 are configured to engage the contact surface 50, which is part of the intermediate bearing 116. In the illustrated embodiment, the contact surface 50 includes teeth 70 for providing a ratcheting (e.g., interlock) engagement between the sprags 20 and the contact surface 50. In other embodiments, such as the embodiment illustrated in FIG. 8, the contact surface 50 may be a relatively flat surface 119, and a frictional force between this contact surface 50 and the sprags 20 may provide the one directional rotation of the intermediate bearing 116.

Figure 8:
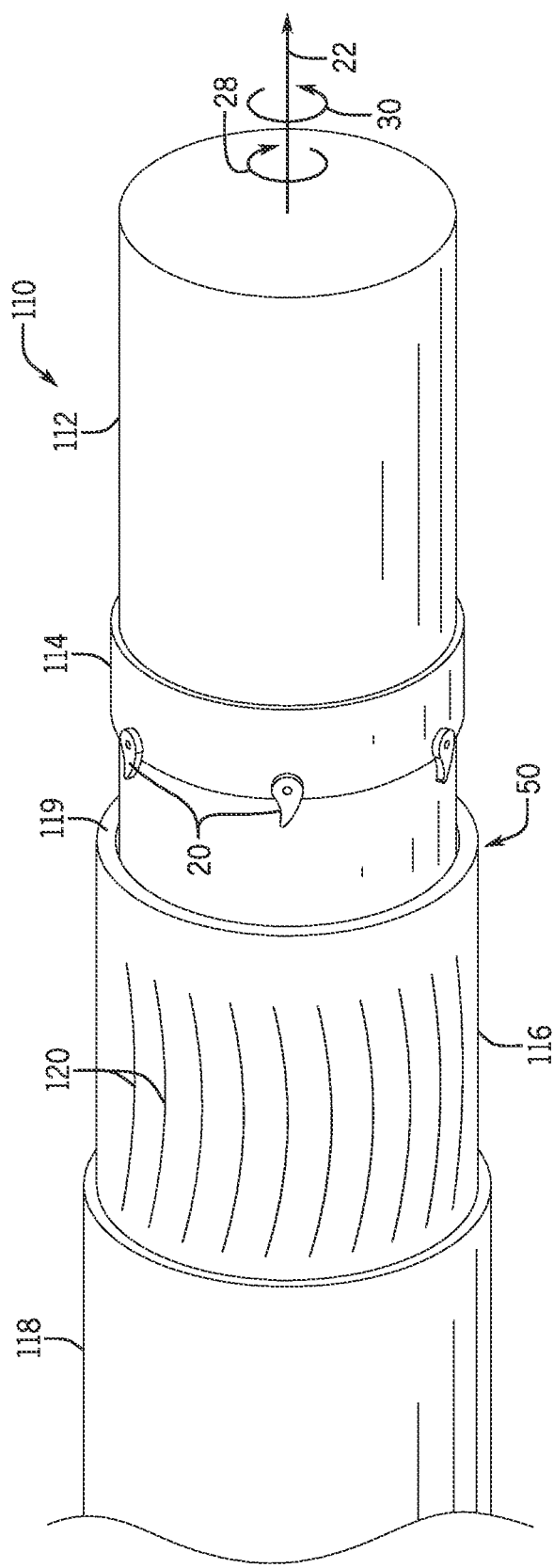
FIG. 8 is an exploded perspective view of a cylindrical plain bearing assembly configured to provide lubrication during oscillatory motion, in accordance with an embodiment of the present techniques.

In FIGS. 7 and 8, the plain bearing assembly 110 is configured such that, when the shaft 112 rotates in the first direction 28 (e.g., clockwise) about the bearing system axis 22, the sprags 20 engage the contact surface 50 and urge, or allow, the intermediate bearing 116 to rotate in the first direction 28 with the rotating shaft 112. When the shaft 112 rotates in the second direction 30 (e.g., counterclockwise) about the bearing system axis 22, the sprags 20 slip past the contact surface 50, thereby preventing or resisting rotation of the intermediate bearing 116 in the second direction 30 along with the rotating shaft 112. Thus, the illustrated embodiments facilitate the rotation of the intermediate bearing 116 primarily in the first direction 28, even while the shaft 112 exhibits oscillating rotation about the bearing system axis 22.

To facilitate increased distribution and mechanical application of the lubricant in the plain bearing assembly 110, the intermediate bearing 116 may include distribution features configured to distribute the lubricant between the intermediate bearing 116 and the external bearing 118, between the intermediate bearing 116 and the shaft 112, or both. For example, in the illustrated embodiment, the intermediate bearing 116 includes directional flow grooves 120 formed therein, although other types of distribution features may be used in other embodiments. The grooves 120 may extend part of the way into the intermediate bearing 116 in some embodiments. Similar grooves 120 may also be present along a surface of the intermediate bearing 116 facing the shaft 112, in order to provide lubrication between the shaft 112, the intermediate bearing 116, and the external bearing 118. In embodiments with relatively lighter loads on the plain bearing assembly 110, the grooves 120 may extend entirely through the intermediate bearing 116, such that the intermediate bearing 116 has rungs arranged in a cylindrical shape.

The directional flow grooves 120 may be shaped specifically to aid application of the lubricant as the intermediate bearing 116 rotates in the first direction 28. In the illustrated embodiment, for example, the grooves 120 follow a curved profile, where a concave side of the curved profile faces the first direction 28 in which the intermediate bearing 116 is configured to rotate. In other embodiments, the grooves 120 may be formed in a "Chevron shape", similar to a V-shaped pattern. Other shapes and profiles of the grooves 120 may be used in different embodiments to promote the distribution of lubricant in the plain bearing assembly 110.

Figure 9:
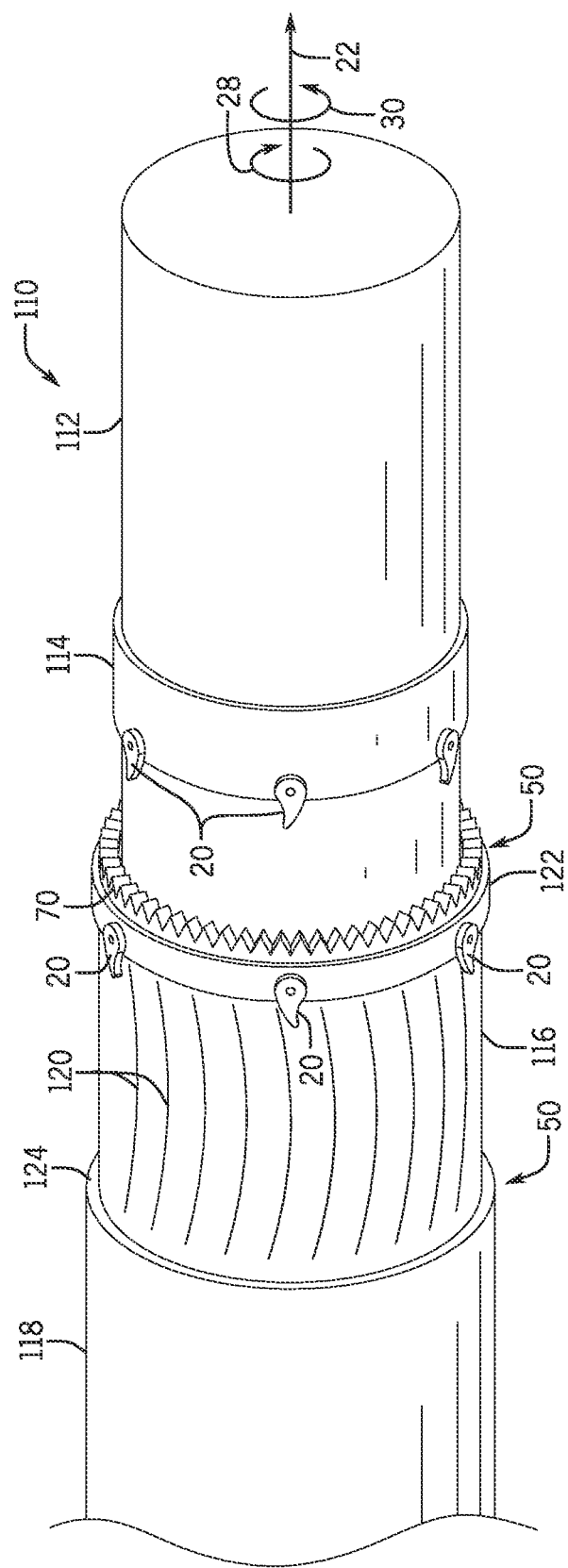
FIG. 9 is an exploded perspective view of a cylindrical plain bearing assembly configured to provide lubrication during oscillatory motion, in accordance with an embodiment of the present techniques.

In some embodiments, it may be desirable to provide redundancy to the main sprag 20 and contact surface 50 mechanism between the shaft-mounted collar 114 and the intermediate bearing 116. FIG. 9 illustrates an embodiment of the plain bearing assembly 110 that includes an additional set of sprags 20 configured to engage with another contact surface 50. More specifically, the first sprag 20 and contact surface 50 coupling between the shaft 112 and the intermediate bearing 116 may be supplemented via a second sprag 20 and contact surface 50 coupling between the intermediate bearing 116 and the external bearing 118. In the illustrated embodiment, the second set of sprags 20 are mounted to the intermediate bearing 116 via a collar 122 disposed on and coupled to the intermediate bearing 116, and the second contact surface 50 includes a relatively flat surface 124 disposed on an edge of the external bearing 118. However, in other embodiments, different arrangements of these components may be used. For example, the second contact surface 50 of the external bearing 118 may include teeth 70, similar to the first contact surface of the intermediate bearing 116.

The second set of sprags 20 and the contact surface 50 coupled between the intermediate and exterior bearings 116 and 118 may be positioned in a way that prevents or resists rotation of the intermediate bearing 116 in the second direction 30 about the bearing system axis 22. If the first set of sprags 20 do not slip past the teeth 70 of the first contact surface 50 as desired when the shaft 112 rotates in the second direction 30, then the second set of sprags 20 may engage the contact surface 50 of the external bearing 118 to prevent or resist rotation of the intermediate bearing 116 in the second direction 30 along with the shaft 112. When the shaft 112 and the intermediate bearing 116 rotate together in the first direction 28, the second set of sprags 20 may simply slip over the contact surface 50 of the exterior bearing 118. Thus, the second set of sprags 20 and the contact surface 50 may provide redundancy the primary set of sprags 20 and the corresponding contact surface 50 between the shaft 112 and the intermediate bearing 116.

Figure 10:
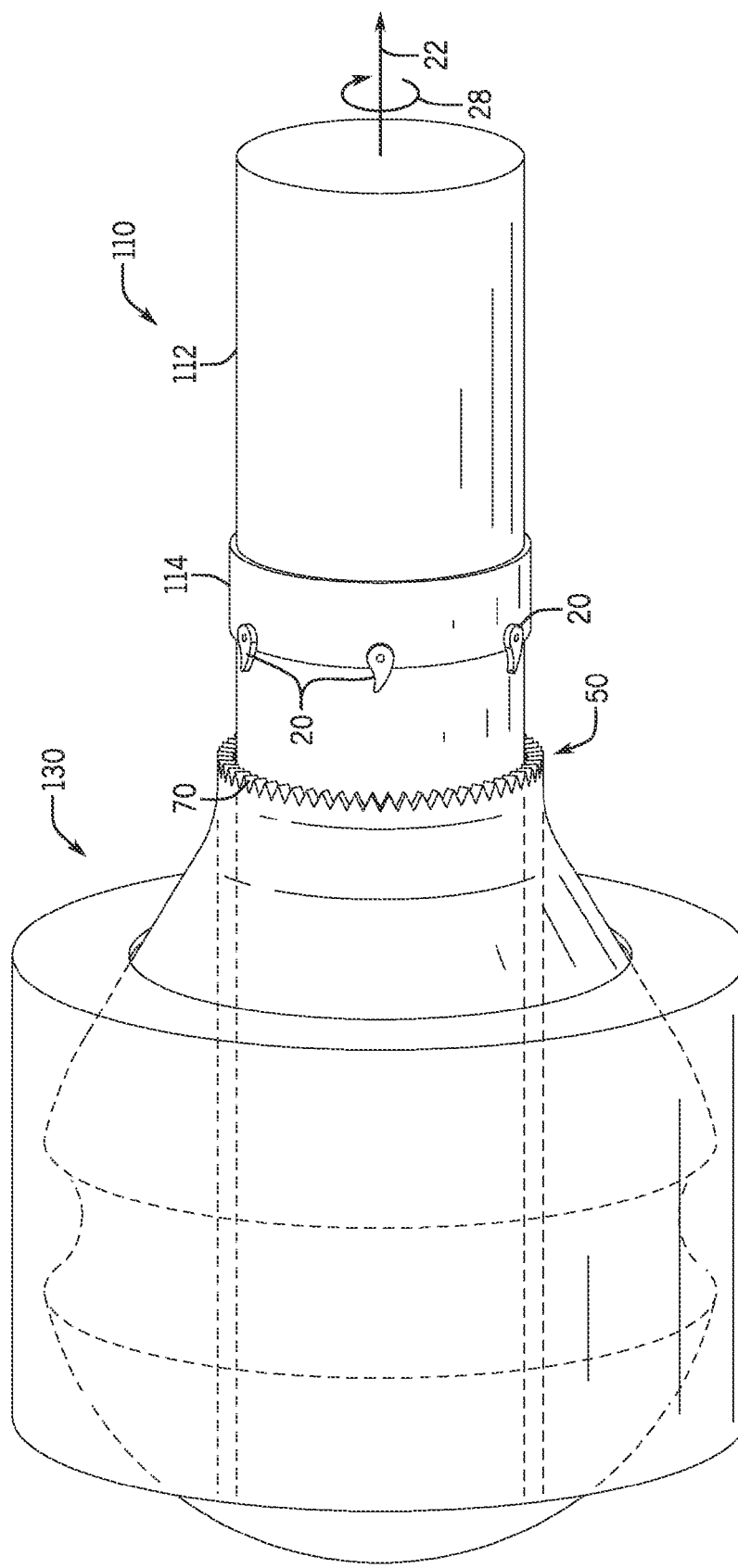
FIG. 10 is an exploded perspective view of a spherical plain bearing assembly configured to provide lubrication during oscillatory motion, in accordance with an embodiment of the present techniques.

Similar techniques may be applied to other types of plain bearing assemblies 110 in addition to plain cylindrical bearings. For example, FIG. 10 illustrates an embodiment of the plain bearing assembly 110 being used to provide one directional motion of the intermediate bearing 116 relative to a spherical external bearing 130. In this embodiment, the shaft 112 may rotate in either direction, but the cylindrical intermediate bearing 116 may rotate primarily in the first direction 28 between the spherical external bearing 130 and the shaft 112. As discussed above with reference to FIG. 9, the exterior portion of the spherical bearing 130 may include teeth 70, the frictional flat surface 124, or sprags 20 configured to engage with the intermediate portion of the spherical bearing 130, in order to keep this intermediate portion from rotating about the bearing system axis 22 in the second direction 30.

Figure 11:
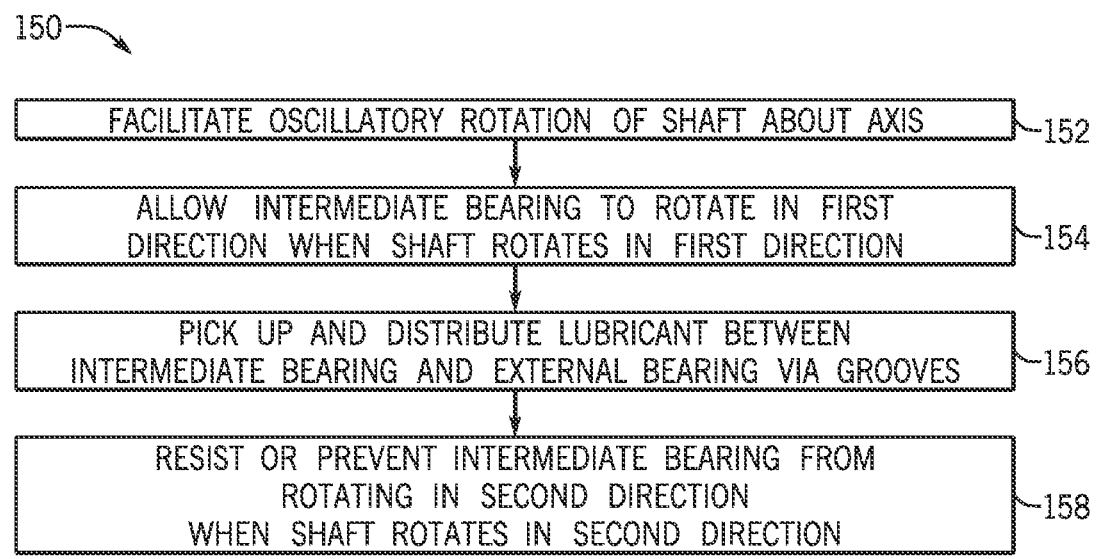
FIG. 11 is a process flow diagram of a method for lubricating a plain bearing assembly during oscillatory motion, in accordance with an embodiment of the present techniques.

FIG. 11 illustrates a method 150 for lubricating the plain bearing assembly 110 used in oscillating rotary applications. The method 150 includes facilitating (block 152) oscillatory rotation of the shaft 112 about the bearing system axis 22. The method 150 also includes allowing (block 154) the intermediate bearing 116 to rotate about the bearing system axis 22 in the first direction 28 when the shaft 112 rotates in the first direction 28. In addition, the method 150 may include picking up and redistributing (block 156) lubricant between the intermediate bearing 116 and the external bearing 118 via the grooves 120 formed in the intermediate bearing 116, when the intermediate bearing 116 is rotating in the first direction 28. Further, the method 150 includes providing resistance to or preventing (block 158) the intermediate bearing 116 from rotating about the bearing system axis 22 in the second direction 30 when the shaft 112 rotates in the second direction 30. It should be noted that in the embodiments disclosed in above, the intermediate bearing 116 may rotate slightly in the second direction 30 in response to the shaft 112 rotating in the second direction 30. However, the distance of this revolution may be negligible in comparison with the distance of rotation of the intermediate bearing 116 in the first direction 28, as permitted by the sprags 20 and the contact surface 50.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
 a plain bearing assembly configured to enable rotation of a shaft about a bearing system axis of the shaft, wherein the plain bearing assembly comprises the shaft, a cylindrical intermediate bearing disposed about the shaft, and an external bearing disposed about the cylindrical intermediate bearing;
 wherein the plain bearing assembly is configured to facilitate oscillatory motion of the shaft relative to the external bearing such that, when the shaft rotates in a first direction about the bearing system axis, the cylindrical intermediate bearing rotates about the bearing system axis in the first direction, and when the shaft rotates in a second direction opposite the first direction about the bearing system axis, rotation of the cylindrical intermediate bearing about the bearing system axis is resisted or prevented, wherein the plain bearing assembly comprises a first sprag configured to engage with a first contact surface to facilitate rotation of the cylindrical intermediate bearing about the bearing system axis when the shaft is rotating in the first direction and to prevent rotation of the cylindrical intermediate bearing about the bearing system axis in the second direction when the shaft is rotating in the second direction, wherein the first contact surface comprises a wall oriented transverse to the bearing system axis.

2. The system of claim 1, wherein the first sprag is coupled to the shaft via a collar disposed about and coupled to the shaft, and wherein the first contact surface is disposed on the cylindrical intermediate bearing.

3. The system of claim 1, wherein the first sprag is coupled to the cylindrical intermediate bearing.

4. The system of claim 1, wherein the first sprag and the first contact surface are configured such that a biasing force between the first sprag and the first contact surface holds the first sprag and the first contact surface in engagement.

5. The system of claim 1, wherein the first contact surface comprises ratchet teeth along the wall for interlocking with the first sprag.

6. The system of claim 1, wherein the plain bearing assembly comprises a second sprag configured to engage with a second contact surface to prevent rotation of the cylindrical intermediate bearing about the bearing system axis in the second direction, wherein the second sprag extends from the cylindrical intermediate bearing and the second contact surface is on the external bearing, and wherein the second contact surface comprises a second wall oriented transverse to the bearing system axis.

7. The system of claim 6, wherein the first sprag is oriented in a first direction to index with the first contact surface, and wherein the second sprag is oriented in a second direction opposite the first direction to index with the second contact surface.

8. The system of claim 1, wherein the external bearing comprises a cylindrical bearing.

9. The system of claim 1, wherein the external bearing comprises a spherical bearing.

10. A bearing system, comprising:
 a shaft axially aligned with a bearing system axis;
 a first collar disposed about and directly coupled to the shaft;
 a cylindrical intermediate bearing disposed about the shaft;
 a first sprag comprising a first end rotatably coupled to the first collar and a second end in contact with a contact surface of the cylindrical intermediate bearing, wherein the contact surface comprises a wall oriented transverse to the bearing system axis;
 a stationary external bearing disposed about the cylindrical intermediate bearing;
 wherein the first sprag is configured to engage the contact surface of the cylindrical intermediate bearing in a manner that encourages rotation of the cylindrical intermediate bearing in a first direction about the bearing system axis when the shaft is rotating in the first direction, and wherein the first sprag is configured to slide relative to the contact surface of the cylindrical intermediate bearing to prevent or resist rotation of the cylindrical intermediate bearing in a second direction about the bearing system axis when the shaft is rotating in the second direction opposite the first direction.

11. The bearing system of claim 10, wherein the contact surface of the cylindrical intermediate bearing comprises ratchet teeth, and wherein the first sprag is spring-loaded to interlock with the teeth when the shaft is rotating in the first direction.

12. The bearing system of claim 10, comprising a second collar disposed about and coupled to the cylindrical intermediate bearing, and a second sprag comprising a first end rotatably coupled to the second collar and a second end in contact with a contact surface of the external bearing, wherein the second sprag is configured to engage the contact surface of the external bearing to prevent the cylindrical intermediate bearing from rotating in the second direction about the bearing system axis when the shaft is rotating in the second direction.

13. The bearing system of claim 10, wherein the cylindrical intermediate bearing comprises distribution features configured to facilitate distribution of lubricant between the cylindrical intermediate bearing and the external bearing, between the cylindrical intermediate bearing and the shaft, or both.

14. The bearing system of claim 13, wherein the distribution features comprise grooves formed in the cylindrical intermediate bearing.

15. The bearing system of claim 14, wherein the grooves extend through the cylindrical intermediate bearing between the shaft and the external bearing.

16. The bearing system of claim 14, wherein each of the grooves comprise a curved profile, wherein a concave side of the curved profile faces the first direction.

17. The bearing system of claim 10, wherein the contact surface of the cylindrical intermediate bearing includes grooves or teeth.

18. A method, comprising:
   rotating a shaft about a bearing system axis of the shaft, wherein the plain bearing assembly comprises a collar disposed on the shaft, a cylindrical intermediate bearing disposed about the shaft, and an external bearing disposed about the cylindrical intermediate bearing;
   rotating the cylindrical intermediate bearing about the bearing system axis in a first direction when the shaft rotates in the first direction about the bearing system axis; and
   causing the cylindrical intermediate bearing to experience resistance to rotation about the bearing system axis in a second direction opposite the first direction when the shaft rotates in the second direction about the bearing system axis, wherein rotating the cylindrical intermediate bearing about the bearing system axis in the first direction comprises engaging a sprag coupled to the collar with a contact surface coupled to the cylindrical intermediate bearing when the shaft rotates in the first direction, wherein the contact surface extends transverse to the bearing system axis, and wherein causing the cylindrical intermediate bearing to experience resistance to rotation comprises sliding the contact surface of the cylindrical intermediate bearing relative to the sprag when the shaft rotates in the second direction.

19. A method, comprising:
   a method of lubricating a plain bearing assembly, comprising:
      rotating a shaft about a bearing system axis of the shaft, wherein the plain bearing assembly comprises a collar disposed on the shaft, a cylindrical intermediate bearing disposed about the shaft, and an external bearing disposed about the cylindrical intermediate bearing;
      rotating the cylindrical intermediate bearing about the bearing system axis in a first direction when the shaft rotates in the first direction about the bearing system axis;
      causing the cylindrical intermediate bearing to experience resistance to rotation about the bearing system axis in a second direction opposite the first direction when the shaft rotates in the second direction about the bearing system axis; and
      distributing lubricant between the cylindrical intermediate bearing and the external bearing via grooves formed in the cylindrical intermediate bearing when the cylindrical intermediate bearing is rotating in the first direction.

* * * * *